Nov. 4, 1952 W. E. OLSON 2,616,734
BICYCLE SADDLE POST
Filed Feb. 15, 1950 2 SHEETS—SHEET 2
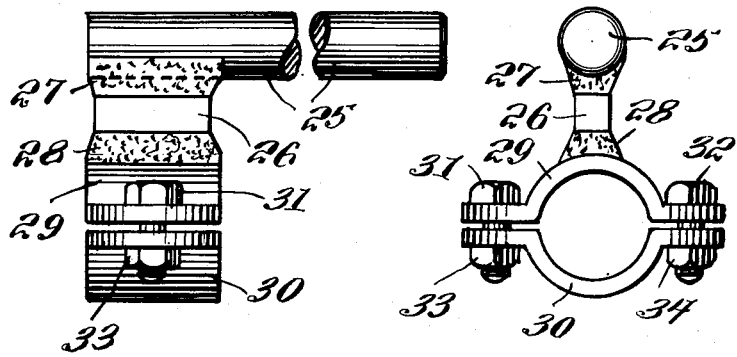
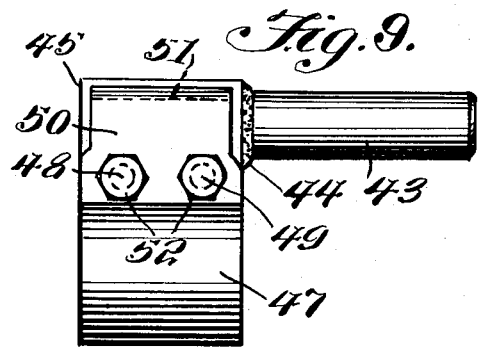
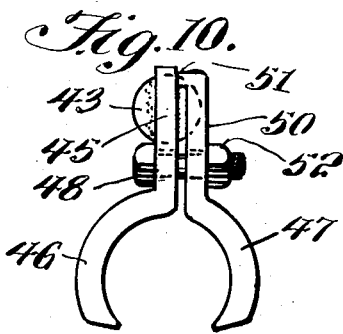
INVENTOR.
Wilbert E. Olson,
BY Victor J. Evans & Co.
ATTORNEYS Patented Nov. 4, 1952

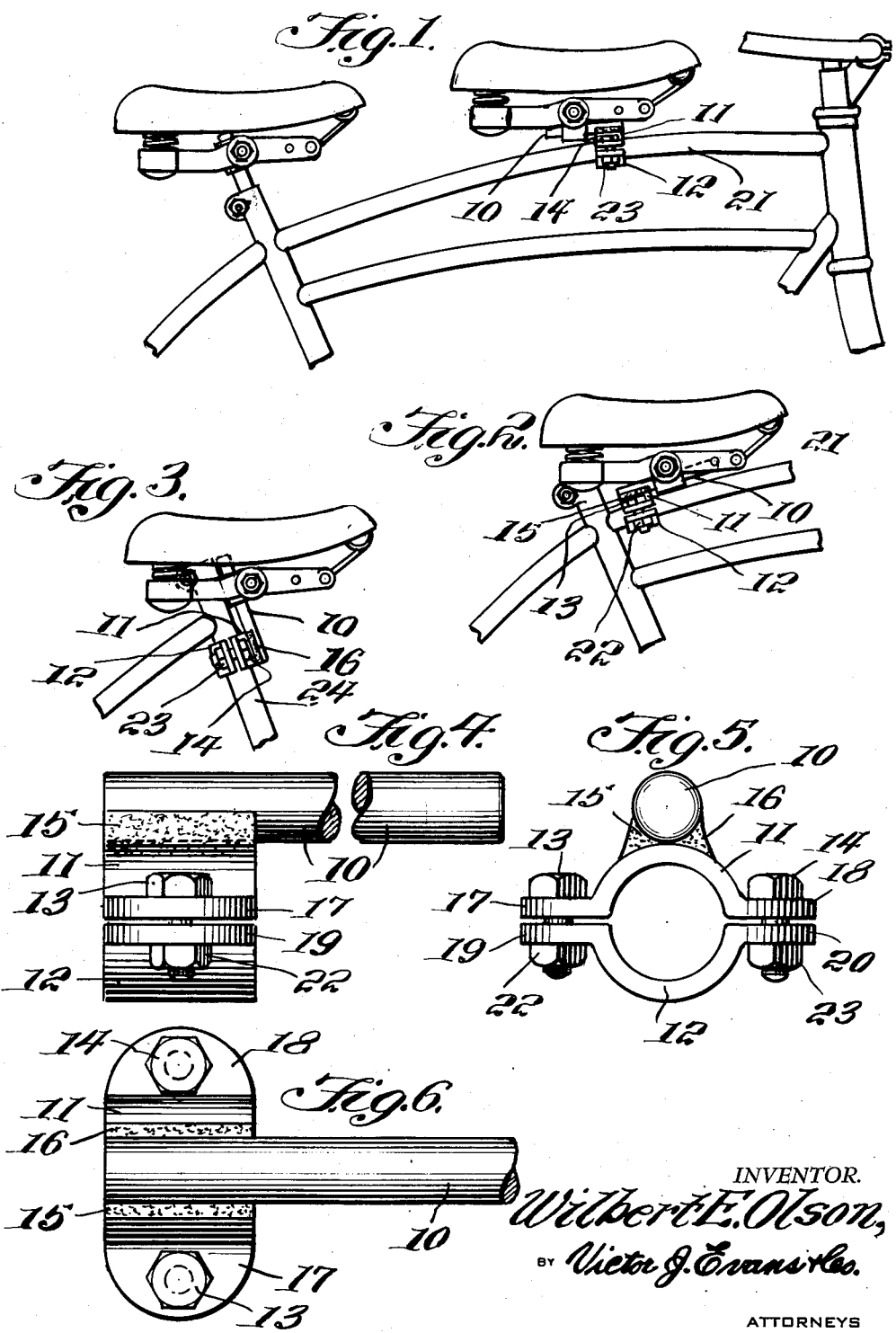

2,616,734

UNITED STATES PATENT OFFICE 2,616,734

BICYCLE SADDLE POST

Wilbert E. Olson, St. Paul, Minn.

Application February 15, 1950, Serial No. 144,240

1 Claim. (Cl. 287—54)

This invention relates to saddle mounting attachments or posts for bicycles, and in particular a round saddle carrying bar having clamping elements on one end thereof by which the bar is clamped to a tubular bar of the frame of a bicycle and upon which a saddle is mounted.

The purpose of this invention is to provide a saddle mounting post for bicycles whereby the saddle may be considerably lower and may also be moved forwardly on the frame of the bicycle and also which provides means for mounting two saddles on a bicycle.

The usual type of saddle post of a bicycle extends upwardly from the rear post of the bicycle frame and as the upper end of the post extends above the upper bar of the frame a saddle is spaced a considerable distance from the frame.

In purchasing a bicycle it is desirable to obtain as large a size as possible so that the bicycle will not be outgrown the following year and with the usual saddle mounting it is difficult for a small child to reach the pedals of the bicycle if the bicycle is a little large.

With this thought in mind this invention contemplates an improved saddle post whereby the saddle of a bicycle may be lowered to a position substantially on the upper bar of the frame whereby a comparatively small child may ride the average bicycle with comfort and ease.

The object of this invention is, therefore, to provide means for constructing a bicycle saddle post whereby the position of the saddle on the bicycle frame is lower and in which the saddle may be adjusted to different positions along the frame.

Another object of the invention is to provide an improved bicycle saddle post in which the post is adapted for use in either a horizontal or vertical position.

A further object of the invention is to provide a bicycle saddle mounting that may be provided as an attachment for a bicycle, which is of a simple and economical construction.

With these and other objects and advantages in view the invention embodies a clamp including a pair of flanged U-shape or semi-circular elements with a saddle mounting bar extended from the upper surface thereof.

Other features and advantages of the invention will appear from the following description taken in connection with the drawings wherein:

Figure 1 is a side elevational view showing the upper part of a bicycle frame with parts broken away and illustrating an extra saddle mounted on an upper bar of the frame.

Figure 2 is a view showing the usual saddle of a bicycle replaced by a saddle carried by the saddle post of this invention.

Figure 3 is a similar view showing the saddle post clamped on a rear post of a bicycle frame.

Figure 4 is a detail illustrating the improved post mounting and showing a side elevation thereof with parts broken away.

Figure 5 is an end view of the post shown in Figure 4.

Figure 6 is a plan view of the post shown in Figure 4.

Figure 7 is a side elevational view illustrating a modification wherein the post is spaced above the mounting clamp.

Figure 8 is an end view of the post shown in Figure 7.

Figure 9 is another side elevational view showing a further modification wherein the post extends from an edge of one of the clamping elements.

Figure 10 is an end view of the mounting shown in Figure 9.

The saddle mounting post of this invention includes a round post or bar 10, mounted by welding to a semi-circular clamp section 11 and a complementary clamp section 12 is attached to the section 11 by bolts 13 and 14.

The bar 10 is formed of the usual saddle post stock and although it is illustrated as being round it will be understood that it may be of any suitable shape and also of any suitable length. The post 10 is secured to the section 11 of the clamp by welding, as indicated at the points 15 and 16, and the section 15, which in the design shown is substantially semi-circular is provided with flanges 17 and 18 through which the bolts 13 and 14 extend. The complementary section 12 is also semi-circular and flanges 19 and 20, similar to the flanges 17 and 18 extend from the ends thereof. The bolts 13 and 14 extend through the flanges of both sections and the sections of the clamps are secured together, with the clamps rigidly held on a bar 21 of a bicycle by nuts 22 and 23 on the bolts 13 and 14, respectively.

With the parts formed in this manner the improved saddle post may be mounted on the bar 21 of a bicycle frame as illustrated in Figure 1 with the post 10 extended rearwardly, or with the post extending forwardly, as illustrated in Figure 2, or the clamp may be positioned on the vertical post at the rear of the bicycle, which is indicated by the numeral 24, with the post extended upwardly.

In the design illustrated in Figures 7 and 8 the bar or post, which is indicated by the numeral 25, and which is similar to the post 10 is separated from the clamp by a web 26 which is connected by welding 27 to the post 25 and by welding 28 to the upper clamp section 29. The attachment is clamped to the bar of a bicycle by the complementary clamp 30, similar to the section 12, with bolts 31 and 32 which are provided with lock nuts 33 and 34, respectively.

In the design illustrated in Figures 9 and 10 a post 43, also similar to the post 10 is mounted, by welding 44 on the end of a flange 45 of the clamp section 46 and a complementary section 47 of the clamp is secured to the section 46 by bolts 48 and 49. The clamp section 47 is also provided with a flange 50 and the flange is provided with a toe or projection 51 that is positioned to coact with the bolts 48 and 49 to clamp the sections 46 and 47 over a bar of a bicycle frame. The bolts 48 and 49 are provided with nuts 52.

It will be understood, therefore, that the saddle mounting post may be mounted on the clamp in various positions and may extend horizontally or vertically or at any suitable angle from the clamp. The attachment may also be provided in different designs and also of different sizes.

It will also be understood that other modifications may be made in the design and arrangement of the parts without departing from the spirit of the invention.

What is claimed is:

In a bicycle saddle mounting, the combination which comprises a post for receiving a clamp of a bicycle saddle, a semicircular clamp section having flanges extended from the ends thereof mounted on one end of the said post, a complementary semicircular clamp section also having flanges extended from the ends thereof positioned against the clamp section on which the post is mounted, said complementary section being positioned in opposed relation to the section on which the post is carried and the inner surfaces of the said assembled clamp sections defining a cylindrical opening the axis of which is parallel to the axis of the said post on one of the said clamp sections, and bolts extended through the flanges of the sections with nuts on the ends of the bolts for clamping the said clamp sections on a bar of a bicycle frame.

WILBERT E. OLSON.

REFERENCES CITED

The following references are of record in the file of this patent:

FOREIGN PATENTS

| Number | Country | Date |
|---|---|---|
| 27,361 | Great Britain | Nov. 28, 1913 |
| 340,856 | Great Britain | Jan. 8, 1931 |
| 424,532 | Great Britain | Feb. 22, 1935 |